United States Patent
Haviv et al.

(10) Patent No.: US 10,825,324 B2
(45) Date of Patent: Nov. 3, 2020

(54) SYSTEM AND METHOD FOR LOCATING, FINDING AND ANTI-THEFT PROTECTING AN OBJECT OF INTEREST

(71) Applicants: Rony Haviv, Westlake Village, CA (US); Yoav Ben-David, Tel Aviv (IL); Moshe Zach, Hod Hasharon (IL)

(72) Inventors: Rony Haviv, Westlake Village, CA (US); Yoav Ben-David, Tel Aviv (IL); Moshe Zach, Hod Hasharon (IL)

(73) Assignee: Rony Haviv, Westlake Village, CA (US)

( * ) Notice: Subject to any disclaimer, the term of this patent is extended or adjusted under 35 U.S.C. 154(b) by 0 days.

(21) Appl. No.: 16/537,578

(22) Filed: Aug. 11, 2019

(65) Prior Publication Data

US 2020/0219376 A1 Jul. 9, 2020

Related U.S. Application Data

(60) Provisional application No. 62/789,883, filed on Jan. 8, 2019, provisional application No. 62/853,721, filed on May 29, 2019.

(51) Int. Cl.
| | |
|---|---|
| *G08G 1/08* | (2006.01) |
| *G08B 21/24* | (2006.01) |
| *H04W 4/02* | (2018.01) |
| *A45C 13/30* | (2006.01) |
| *H04W 4/80* | (2018.01) |
| *A45C 13/18* | (2006.01) |
| *H04W 4/70* | (2018.01) |

(52) U.S. Cl.
CPC .............. *G08B 21/24* (2013.01); *A45C 13/18* (2013.01); *A45C 13/30* (2013.01); *H04W 4/027* (2013.01); *H04W 4/70* (2018.02); *H04W 4/80* (2018.02)

(58) Field of Classification Search
CPC ..................................................... G08B 21/24
See application file for complete search history.

(56) References Cited

U.S. PATENT DOCUMENTS

| | | | |
|---|---|---|---|
| 9,196,139 B2 | 11/2015 | Gutierrez et al. | |
| 10,163,318 B2 | 12/2018 | Kazerouni | |
| 2005/0134459 A1* | 6/2005 | Glick | G08B 25/009 340/572.1 |
| 2010/0097237 A1* | 4/2010 | Christiansen | G08B 13/1427 340/686.6 |

(Continued)

OTHER PUBLICATIONS

International Search Report and Written Opinion for PCT/IB2019/057473, dated Nov. 7, 2019.

*Primary Examiner* — Tai T Nguyen

(57) ABSTRACT

A system for locating and anti-theft protecting an object of interest; said system comprising: (a) at least short-distance communication handheld device; (b) at least one radio-frequency transceiver arrangement placeable in or attachable on said object interest; said radio-frequency transceiver comprising: (i) an electric battery; (ii) a transceiver connectable to said short-distance communication hand-held device; (iii) at least one acceleration sensor of acceleration applied to said object of interest; (iv) a warning indicator; (v) a microcontroller configured for activating said warning indicator in response to pairing said transceiver with said short-distance wireless communication handheld device.

22 Claims, 3 Drawing Sheets

(56) References Cited

U.S. PATENT DOCUMENTS

| | | | |
|---|---|---|---|
| 2010/0178913 A1* | 7/2010 | Herbert | G08B 13/1427 |
| | | | 455/426.1 |
| 2013/0225127 A1 | 8/2013 | Cavacuiti et al. | |
| 2015/0242665 A1* | 8/2015 | Antonescu | G06K 19/0724 |
| | | | 340/8.1 |
| 2015/0356861 A1* | 12/2015 | Daoura | G08B 21/0277 |
| | | | 340/539.13 |
| 2017/0048376 A1* | 2/2017 | Logan | G05B 15/02 |

* cited by examiner

SYSTEM AND METHOD FOR LOCATING, FINDING AND ANTI-THEFT PROTECTING AN OBJECT OF INTEREST

FIELD OF THE INVENTION

The present invention relates to systems and methods of detecting and locating an object of interest and easily identifying the object of interest in a visual or audio manner. More specifically, the present invention relates to systems and methods of detecting and locating an object of interest based on short-distance communication established between a handheld device and an arrangement placeable in or attachable to the object of interest.

BACKGROUND OF THE INVENTION

Generally as in commercial flight the passengers deliver some of their baggage as bags suitcases and some other relatively big stuff as baby trolley in the check in station in the airport before the flight. After landing, the passengers that got down from the aircraft in the destination airport goes to the baggage claim hale to collect their baggage that was stored in the cargo cabinet of the aircraft during the flight. Usually the passengers go to the right conveyor according the flight number and the airline company where the returned baggage is expected to be traveled on to be collected by the passengers.

Usually the passengers are waiting around the conveyor until the baggage is loaded on the conveyor and then they are visually search for their baggage as bags, suitcases and other stuff hopefully to identify and find it as soon as possible.

While the passenger are waiting to find their baggage they are visually scan each bag and suitcase trying to identify it by their shape, appearance and other preinstalled marks as colored piece of cloth.

Many times the passengers stands so close to the conveyor in pressing and in high pressing unconfutable while required high attention and high sight capability to identify their baggage.

These conditions in such circumstances especially after long flight with large number of passengers require extra efforts and attention which is difficult as for physically weak people as old age, sick, cripple people and others whose sight is not perfect.

Many time the passengers stand in these unconfutable conditions for long time in standing position trying to keep their convenient waiting position until finding all their returned baggage.

In commercial airline flights passengers deliver some of their baggage such as bags and suitcases in a check in station in the airport before the flight. The check-in baggage is loaded onto the airplane at the origin. On arrival at the destination, the check-in baggage is unloaded and transported to a baggage claim hall, usually on a conveyor belt specific for the passenger's flight. The passenger waits near the conveyor until they see their baggage which they then remove from the conveyor belt. A passenger, usually, identifies his baggage visually by size, shape and sometimes specific markings, tags or labels.

Often, passengers stand crowded together close to the conveyor belt. Such conditions are uncomfortable and unpleasant, especially after long flights, flights at unusual hours or for populations such as the elderly or passengers with small children.

DE202005016471 discloses a luggage recognition indicator for an airport carousel having a receiver mounted on the luggage and an emitter carried by the user to actuate the receiver. The receiver is connected to a visual or audio alarm to inform the owner of the whereabouts of their luggage. The emitter can actuate several receivers on the luggage conveyor.

CN205072275 discloses a multipurpose case or bag, including a box, a control panel, a handle and a wheel, the bottom of the box which is equipped with four wheels, control panel sets up the one side at the box, the handle set up the top at the box. The multipurpose case still includes an auxiliary power system and a portable power source. The portable power source is set up on the box and equipped with control circuit in the control panel. The control circuit is connected to the portable power source. The auxiliary power system is connected with four wheels respectively, and the auxiliary power systems and control circuit is connected.

KR101888539B1 discloses a baggage receiving guide system and a method thereof, which directly show, to a corresponding passenger, a position of a baggage transferred and guided in a baggage receiving area of an airport, which is an area guiding the baggage to be received, show the position of the baggage transferred and guided in the baggage receiving area of the airport through a screen of a still image or a video, install a lighting member which is flickered in a pre-designated rule on a baggage of a passenger, provide flickered information which is synchronized by flickering of the lighting member of the baggage, to be output in a customer terminal, recognize a theft and show to search for a thief when the baggage of the passenger is stolen by the thief in the baggage receiving area installed in the airport. The baggage receiving guide system comprises: a baggage receiving area installed in an airport, and having a baggage of a passenger transferred along a conveyor belt; a tag attached to the baggage of the passenger, and transmitting a baggage position guide signal including identifier information used to identify a corresponding baggage; and a passenger terminal mounted with a baggage guide application for recognizing the baggage of the corresponding passenger in reference to the identifier information among information included in the baggage position guide signal transmitted from the tag, measuring a received signal strength (RSSI) of the baggage position guide signal, and guiding a position of the baggage of the corresponding passenger transferred along the conveyor belt of the baggage receiving area on the basis of basic strength measurement information which is a measured value thereof.

US2018116361 discloses a multifunctional smart luggage carrier include a body defining an enclosure and having at least one opening. The luggage carrier may include an automatic telescopic retractable handle, retractable wheels, and automatic lifting mechanism for easy carrying and moving or easily transfer the luggage carrier. The luggage carrier may also include a processor, a wireless receiver, electronically controllable lock, and virtual tag (for exchange real time info for e.g., flight or train times, departure gates, weather and weight of the suitcase), built in tracking system (for tracking the Luggage carrier during travelling), weigh scale and location sensor for detecting location of luggage carrier.

US2015348347 discloses a multi-functional active container (e.g., luggage or suitcase) with a plurality of sensors and actuators is described. The container may include a body defining an enclosure and having at least one opening. The container may include a processor, a wireless receiver, and an electronically controllable lock. The processor can selectively lock or unlock the electronically controllable lock based on signals received via a wireless receiver (e.g., via Wi-Fi or BLUETOOTH connections). In some examples, a distance between the active container and a remote device (e.g., a smart phone) can be determined (e.g., based on relative GPS signals or connection strength) and if the distance exceeds a threshold, the electronically controllable lock can be activated to secure the container. Further, the container may include a rechargeable power source for powering external devices and an integrated weight sensor for detecting the weight of the container.

Operation of devices autonomously embedded in or attached to a suitcase is sufficiently limited by capacity of an electric battery. Thus, there is a long-felt and unmet need for providing a system for detecting and locating an object of interest configured for indicating and anti-theft protecting the aforesaid object which is characterized by improved working lifespan.

SUMMARY OF THE INVENTION

It is hence one object of the invention to disclose a system for locating and anti-theft protecting an object of interest. The aforesaid system comprising: (a) at least short-distance communication handheld device; (b) at least one radio-frequency arrangement placeable in or attachable on said object interest; said radio-frequency arrangement comprising: (i) an electric battery; (ii) a transceiver connectable to said short-distance communication hand-held device; (iii) an indicator element; (v) a microcontroller configured for activating said warning indicator in response to pairing said transceiver with said short-distance wireless communication handheld device.

A further object of the invention is to disclose a Power Bank battery comprising a wireless transceiver connectable to a short-distance wireless communication with hand-held device.

A further object of the invention is to disclose the short-distance communication handheld device selected from the group consisting of a smartphone, a tablet computer; a laptop computer, a personal data assistant and any combination thereof.

A further object of the invention is to disclose the object of interest selected from the group consisting of a suitcase, a bag, a purse, a box, a carton and any combination thereof.

A further object of the invention is to disclose the transceiver which is pairable with said short-distance communication handheld device at a distance shorter than 100 meter there between.

A further object of the invention is to disclose the short-distance wireless communication which is Bluetooth or Wi-Fi protocol.

A further object of the invention is to disclose the warning indicator comprising at least one component selected from the group consisting of a light source, a sound source, a vibrator and any combination thereof; said component is configured for changing emitted light by said microcontroller in response to pairing with said handheld device.

A further object of the invention is to disclose the radio-frequency transceiver arrangement comprising at least one sensor selected from the group consisting a temperature sensor, a humidity sensor, a barometric-pressure sensor.

A further object of the invention is to disclose the radio-frequency beacon arrangement comprising a memory unit configured for logging data sensed by said acceleration sensor, a temperature sensor, a humidity sensor, a barometric-pressure sensor.

A further object of the invention is to disclose the microcontroller configured for transmitting data logged in said memory unit to said handheld device.

A further object of the invention is to disclose at least one radio-frequency transceiver arrangement which is pairable with more than one said handheld device.

A further object of the invention is to disclose the arrangement which is wirelessly connectable to an internet network as an IoT Network and Data protocol.

A further object of the invention is to disclose the microcontroller configured for sending an alarm signal to said handheld device and/or activating said warning indicator in response to disconnecting said transceiver and said short-distance wireless communication handheld device.

A further object of the invention is to disclose power bank comprising: (a) at least one sensor configured for sensing at least one parameter; (b) a wireless transceiver connectable to a short-distance wireless communication hand-held device; said wireless transceiver is configured for receiving an inquiry from said short-distance wireless communication hand-held device and transmit sensed data to said short-distance wireless communication hand-held device.

A further object of the invention is to disclose the power bank comprising an auxiliary connector for connecting an external load.

A further object of the invention is to disclose the power bank comprising a digital potentiometer configured for varying a voltage on said auxiliary connector.

A further object of the invention is to disclose the arrangement provided with at least one connector for connecting an external load to said power bank.

A further object of the invention is to disclose the method of locating and anti-theft protecting an object of interest; said method comprising steps of: (a) providing a system for locating and anti-theft protecting an object interest; said system further comprising: (i) at least short-distance communication handheld device; (ii) at least one radio-frequency transceiver arrangement placeable in or attachable on said object interest; said radio-frequency transceiver comprising: (1) an electric battery; (2) a transceiver connectable to said short-distance communication hand-held device; (3) at least one acceleration sensor of acceleration applied to said object of interest; (4) a warning indicator; (5) a microcontroller configured for activating said warning indicator in response to pairing said transceiver with said short-distance wireless communication handheld device; (b) reaching an area of occurring said object of interest; (c) pairing said pairing said transceiver with said short-distance wireless communication handheld device; and (d) indicating said object of interest by means of said warning indicator in response to pairing said transceiver with said short-distance wireless communication handheld device.

A further object of the invention is to disclose the method comprising a step of sending an alarm signal to said handheld device and/or activating said warning indicator in response to disconnecting said transceiver and said short-distance wireless communication handheld device.

A further object of the invention is to disclose the method comprising a step of activating an alarm in said handheld device and/or activating said warning indicator in response to disconnecting said transceiver and said short-distance wireless communication handheld device.

A further object of the invention is to disclose the method comprising a step of indicating occurrence of said object of interest within said area.

A further object of the invention is to disclose the method comprising a step of displaying an alarm signal by said hand-held device in response to sensing a tridimensional acceleration applied to said object of interest being out of reach of a user.

A further object of the invention is to disclose the power bank comprising a clip or hook connected to the power bank as near on the USB connector side. The said clip contains the electronic board with the said wireless communication with at least the said transceiver, microcontroller, and least one sensors indicator elements as audio and visual as LEDs and/or at least one connector as the USB connector.

The said clip enables the power bank to be stored in a baggage as a bag while the clip is externally to the bag so the indicator elements in the clip can be seen or heard effectively. Where a connector as the USB connector for a Hand Handled Device as Smartphone is mounted on the said clip it is much convenient and easy for the user to charge the Smartphone by connecting the USB cable to the connector on the clip which is externally to the bag rather than to insert the USB cable to the power bank that is stored inside the bag or in one of the bag pockets generally comes with a zipper. This clip structure attached to the power bank enable to tie on the power bank stable on the bag while the power bank is stored inside the bag and the clip is outside the bag. This clip structure advantages are many as stable attachment to the bag, easy USB cable connection to the power bank USB connector, visibility and effective hear of the visual and audio elements, the wireless communication antenna is much effective since it is externally and is not hidden as if it was inside the power bank or inside the bag.

The invention, in some embodiments, relates to the field of item identification and, more particularly but not exclusively, to methods and devices useful for items detection, location and identifying such as specific items of baggage. In some exemplary embodiments, the invention provides devices and methods that allow a person to identify baggage as a suitcase or a bag that has been unloaded from an airplane after flight and loaded onto a conveyor belt for recovery.

The present invention can also be used for anti-theft and fast visual identification from a distance of the baggage or any other, object, person or animal from far and short distance. The present invention can also enable detection of picking up or getting down of the baggage or any movement of the baggage while it is not near the baggage owner.

The present invention uses wireless communication for communication between an electronic board mounted in or on the sides of the baggage as suitcase or bag and Hand Handled Devices—HHD as Smartphone.

The present invention uses identification devices as LEDs, audio devices as buzzer, speaker or vibrator for identify the baggage from far or short distance.

The present invention can use sensors as 3D accelerometer for identifying of unusual movement as of the baggage.

Since "Power Bank" that are high capacity batteries for charging a Smartphone are usually carried in baggage as bags then a higher efficiency embodiment of the invention can be integrated wireless board in a "Power Bank" since the Anti lost and finding devices and a "Power Bank" are usually carried together in the baggage as bags.

The present invention can be used as while waiting to collect the baggage as suitcase and bags in baggage claim hales in the airport passenger's terminal after the passengers lending and waiting to their baggage that was stored in the cargo cabinet of the aircraft during the flight to be returned to the passengers after the flight. The present invention as in another mode of operation can also be used for anti-theft and fast visual identification from a distance of the baggage as a bag or any other object, person or animal from far and short distance. The present invention can also enable detection of picking up or getting down of the baggage or any movement of the baggage while it is not near the baggage owner.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

Figure 1:
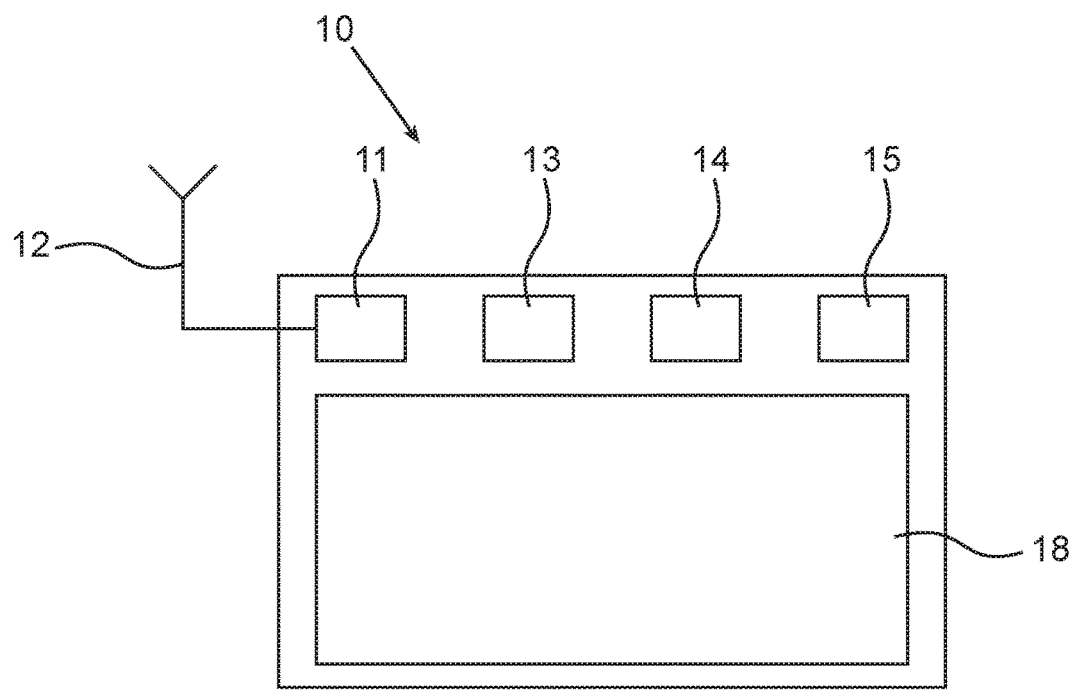
FIG. 1 is a schematic diagram of a radio-frequency transceiver arrangement.

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a system for locating and anti-theft protecting an object of interest and a method of doing the same In accordance with the present invention there is provided electronic card with wireless communication capability with a specific address as MAC address.

To the electronic board is connected any source of light device as LED, LEDs or strip of LEDs. The electronic board with the wireless communication can control the turn on and off of the light and can control other parameters of the light source as color, plash frequency, duty cycle and other parameters.

The electronic board can also be mounted on a baggage as suitcase so the source of light can be mounted externally on the suitcase to be seen by the passenger or the suitcase or bag owner.

The wireless electronic card can be mounted in a suitcase on the bottom side as between the suitcase wheels.

The wireless electronic board can be protected as especially if the LEDs are mounted on a belt that is mounted on the suitcase perimeter and connected to the suitcase handles.

The electronic card and the source of light can be powered by batteries.

In accordance with the present invention, provided at least one software application that can be run on as hand held device—HHD as Smartphone and can be activated and run by as by the passenger or the user.

The software application in the HHD while activated can search wirelessly for the wireless electronic board presence and send an alert to the user as passenger or the baggage owner about the arrival or near presence of the baggage as on the conveyor as in the airport terminal.

The alert about the arrival or presence of the baggage can be visual, sound, vibration or any combination of the these alerts will be send by the HHD to the user as soon as the electronic board as in the baggage will be detected as by wireless search page call that is sent by the HHD.

The wireless electronic board will listen and wait continuously until a wireless search command or call will be sent by from the HHD and received by the electronic board. When the HHD search command or signal will be receive in the electronic board, the electronic board will send a message to the HHD software application about it presence and may connect wirelessly with the HHD. After the HHD and its software application will receive the response from the electronic card, it will alert the user as passenger about the presence of the baggage so the user can go toward the conveyor in order to find and collect his baggage and identify it as by notice the flashing LEDs. After the wireless detection or connection and the alert to the user is happen, the electronic card can turn on as the light source on the external surface of the baggage and or the buzzer in order to be detected and identified easily even from far distance, by the user as the passenger or baggage owner.

The user can stand comfortably without the stress and other efforts for the detection of his returned baggage. The user can stand or set and wait to his baggage in a distance from the conveyor according the wireless effective range of detection that can be even more than as 10 meters or even more than as 100 meters as in supported by standard classic Bluetooth or BLE wireless standards or as by standard WiFi wireless communication.

The HHD application software can also enable the user to control and parameters change remotely in real time as of the light source as LED that is mounted on the baggage, parameters as colors, flashing frequency duty cycle fading etc.

This capability is helpful for much convenient detection and identification verification of the baggage.

The control parameters as for the LEDs and other identifications alerts activation or any other command as locking the suit case or its wheels can be sent remotely wirelessly as in Bluetooth 4.0 and further versions or by other low power wireless communication interfaces and protocols.

The data and the wireless signal strength or BER measurement as RSSI, Bluetooth Link Key etc', for estimation of the distance of the baggage from the HHD. Also sensors data, logged data or other alerts can be sent to the HHD remotely wirelessly as by Bluetooth 4.0 or as by Bluetooth further versions or by other low power wireless communication interfaces and protocols. The LEDs flashing frequency, duty cycle and color can be changed according the distance between the wireless electronic card and the HHD that did a page call to the specific electronic card.

More than one baggage with its wireless electronic card can be detected by the user or users with a specific HHD. The software application can present on the HHD screen the distance of at last one baggage with its electronic card.

The distance may be presented on the user's HHD screen as text, icons, color or as graphic bars that may be changed according the distance and also according the direction if the distance is decreased or increased. As an example as on the conveyor when the distance is decreased as when the baggage comes toward the user the color can be changed from red to yellow and then green or as when the baggage moves away from the user then the color can be changed from green to yellow and then to red according the distance.

The user then can get the indication also about the current motion direction of the baggage refers to the user, as the current distance between the baggage and the user and if it is decreased or increased.

The user can also set and change parameters, as by the HHD, as values of trash holds of indications and alerts activation. An example for parameters setting can be the requested distance of the baggage from the user that will provide the alert for the user by the HHD. The alert that indicates about that the baggage has arrived, and even if it is arrived to a specific distance from the user with the HHD.

Other parameter, as an example, that can be set by the user in the HHD can be the distance of the baggage from the user that indicates about pick up of the baggage from the convey when it is not near the user with the HHD.

Other parameter, as another example that can be set by the user in the HHD can be the distance of the baggage from the user that indicates about movement of the baggage as by analyzing the received data from the 3D accelerometer, when the baggage is not near the user with the HHD.

At least one and even more than one users HHD can page a specific wireless electronic card which is mounted in a specific baggage with his own HHD in order to detect its presence as on the conveyor in the passenger baggage claim hall in the airport. It can be done as by repeat wireless page call to a specific wireless electronic card every specific time duration. If the specific wireless electronic card is in the wireless receive range then it will answer to the specific call of the specific HHD that made the page call.

The wireless electronic card transmitting back only if it receives a page call or any other call according to wireless protocol of the wireless electronic technology of the wireless communication as standard or nonstandard refers to the wireless chip set in the card.

The users and their HHDs can stay anywhere in the within the receive range of the electronic card.

Each of the users HHDs can have all capabilities and features as in one HHD as wireless receiving of data from the 3D accelerometer sensor in the wireless electronic board that is mounted in the baggage. The 3D accelerometer can detect motion in 3D. While on the conveyor the direction is generally horizontal but if the baggage is picked up while the passenger or owner is not very near to the baggage in that case unusual movement detected by the 3D sensor will be sent to or analyzed by the HHD.

The wireless electronic board and its features together with the HHD can be mounted not only in a baggage but it can be also mounted on other objects as for presence detection and rapid identification from distance of the objects by lite LED's or flashing LEDs, audio signal activation and other controls from far distance.

The wireless electronic board and its features together with the HHD can be mounted also on humans or animals as for distance presence or for distant detection as rapid identification of the human or animal as by the plashing LEDs.

Since the LEDs color, flashing frequency, duty cycle, can be changed it can be useful as for a small travel group as a family or larger groups as tourist group to mark their baggage as in specific pre agreed color, flashing frequency, duty cycle in order to identify the baggage as belong to the same group. The agreed mark can be sheered by the group by sending the data to all group members HHDs to be sent wirelessly to the wireless electronic card memory in order to be activated as while the baggage return from a flight to be collected from the conveyor.

In the other mode of operation the present invention as when it is used for Anti lost and easy finding of baggage as bags and fast visual or audio identification from a distance of the baggage or any other, object, person or animal from far and short distance. The present invention can also enable detection and alert of any movement of the baggage as a bag in case of unwanted picking up as theft of the bag or the suitcase. As an example is when a sensor as the 3D accelerometer sensor or any motion, tilt or vibration sensor that is mounted in the baggage detects a movement of the baggage and the distance from the Smartphone that is in communication with the mounted electronic board in the baggage detect as by RSSI or LINK KEY as BER measurement between the wireless board and the HHD to estimate accordingly the distance between the baggage and the Smartphone. if the distance is increased accordingly then the Software application in the Smartphone can alert the user about the baggage as a bag unwanted movement as in case of the baggage theft, since a baggage movement was detected while the distance between the Smartphone and the user is increased or when there is any movement of the baggage while it is not near the baggage owner.

In order to prevent anti lost false alarms as at home or large office where the baggage as a bag can be relatively safe to be far from the user, the current invention enable to define as safe locations so if the user or the baggage are above the range of alert of possible lost. The safe location can be defined by geographical coordination's as by GPS, cellular network triangulation or a specific WiFi network availability in the HHD. When the HHD location is found to be at least one of the predefined location by the user as a safe place, then the HHD and the audio and visual alert devices on the wireless board side will not be activated in order to prevent the unnecessary false alarms.

In case of exit from these predefined safe locations, in case that the baggage with the wireless card will not be identified remotely by the HHD, the HHD will identify that it is not in the safe area as exit from the building or exit to the street. In that case the HHD will alert the user about possible lost as since forgotten of the baggage in the predefined safe area.

The safe area can be defined by the user and the software application in the HHD, as an example on a graphical vector map that is available in the internet for the HHD.

In this mode, the sensors as temperature, humidity, barometric pressure data can be transferred wirelessly via the wireless electronic board to the HHD as Smartphone in order to be analyzed in the HHD for local weather specifically in the environment where the user stays called micro local weather.

The accumulated received data from these sensors can be also analyzed and used as for much precise forecast as of rain or snow fall or for significant expected weather change including alerts to the user by the HHD in the specific location where the user stays assume that the baggage and the wireless electronic card are in the wireless transmit and receive range with the HHD.

In order to increase the accuracy of the micro local weather forecast the HHD as Smartphone can use also available data and weather forecast of local weather as found in the internet in order to calculate the micro local weather where the user stays.

The received data from the sensors as temperature, humidity, barometric pressure data can be also transferred in the other direction as via internet including micro local GPS data of the HHD, to the world wide data cloud in order to share this data and then to enable provide much accurate forecast and status of current weather in a specific area location.

Since the wireless electronic board for its operation requires energy from as battery as a rechargeable battery and since in many cases users carry a large rechargeable battery as a "Power Bank" for charging their Smartphone or their other mobile apertures, generally via standard USB connectors, since that it is much efficient to integrate the wireless electronic card in the charging device as "Power Bank" for charging the mobile apparatus.

The integration with a device as rechargeable battery for mobile device battery charging as "Power Bank" can saves the need to use at least another special battery and enclosure for the wireless electronic card that is anyway must be in the baggage as a bag as well as a "Power Bank" is carried usually in the bag. That embodiment of the present invention except the large capacity of energy of the battery as in "Power Bank" can give other benefits as reducing weight, price, place and volume in the bag of both devices. Other benefits, since the high available energy capacity of the "Power Bank" can be used to drive high power buzzer or speakers or high intensity LEDs for enable detection from much higher range in case as a bag lost or theft.

The Audio alert devices as the buzzer and the visual alerts as LEDs in or on the baggage can be also activated autonomously as when movement of the bag is detected by the 3D accelerometer sensor in the wireless card as when the distance from the user and his Smartphone is far enough as a reason for alert about theft or any unwanted displacement of the baggage as the bag.

When the alert devices are powered from the "Power Bank" it is possible to use higher power alert devices that are effective for much higher distance identification or warning about theft as an effective alarm that warns about possible theft of the bag.

These high power alarm devices can be also efficiently controlled remotely by the user via the electronic card by volume or intensity as necessary and desired by the user.

The "Power Bank" can include wireless charger to the Smartphone as standard Qi wireless charger.

Another benefit as an outcome of the embodiment of the integration of the wireless electronic card in the "Power Bank" is that it can enable remote monitoring and control of the "Power Bank" by the user by his Smartphone. As an example is reading the battery in the power bank as by ADC and transmitting the battery voltage wirelessly to the user's Smartphone so the user can read the battery status remotely without a need to even see the "Power Bank" it is much convenient especially as when the "Power Bank" is in the bag or suitcase. As an example for remotely control of the "Power Bank" is controlling the charging rate of the "Power Bank" rechargeable battery as fast or slow charging. Slow charging is vital since it can increase battery life and prevent battery and the internal battery charger of the "Power Bank" overheat while recharging the "Power Bank". The "Power Bank" can include also other sensors as temperature sensor in order to track the "internal battery temperature and to send and alert to the user in case of overheat.

Another example for "Power Bank" remote control is enable of convenient remote control of additional auxiliary variable voltage and current limit power output source including convenient control and monitoring of the auxiliary power supply by GUI Graphic User Interface in the Smartphone.

When the wireless card is integrated in the "Power Bank", the user by his Smartphone can select a voltage in the auxiliary power supply output so he can provide not only USB+5 VDC standard power, the user in that another embodiment can select the voltage and even current limit, polarity and other voltage source parameters in order to power devices that are not powered by standard USB voltage but they are powered as by other voltages as 3.3V, 4.5V, 9V, 12V etc.

When an a wireless electronic board as BlueTooth, classic or BLE, WiFi or other wireless technology is integrated in the "Power Bank" can be also considered as an "IoT"—internet of Things device with all IoT capabilities as remote monitoring including as from large distance of the "Power Bank"

The Smartphone can also monitor and control at least one "Power Bank"

The efficiency and the advantages and benefits as disclosed in this invention embodiment can be achieved when the wireless electronic as a part is integrated in the "Power Bank".

Some embodiments of the invention relate to object identification and, more particularly but not exclusively, to methods and devices useful for identifying items such as specific items of baggage. In some exemplary embodiments, the invention provides devices and methods that allow a person to identify baggage that has been unloaded from an airplane and loaded onto a conveyor belt for recovery. In some embodiments, a device according to the teachings herein is additionally configured to functions as a power bank.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

The present invention can help these passengers by save the long standing nearby the conveyor and the efforts of visual scanning of the traveled baggage of the other passengers until identification of their own returned baggage. It can also save mistake of collecting others baggage since mistaken visual identification as when similar shape or appearance of other's bag or suitcase. Such mistakes happens from time to time and can lead to unwanted damages and embarrassed and unpleasant situations.

The present invention can search wirelessly the baggage as suitcase or bags and even persons as children or animals and send alert or alerts to the passenger's smartphone or tablet while waiting to arrival of the baggage and close enough so the passenger is does not required to stand very close to the conveyor or to stand at all.

The present invention can also enable full and valid identification of the passenger's baggage visually by marking the suitcase with flashing lights as colored strips of LEDs or as activation of audio devise that can be turned on and can start flash as in predefined frequent color or manually in real time while detected wirelessly by the Smartphone.

When the alert is arrived to his hand handled device as smartphone, the passenger can go towards the conveyor see and recognize his baggage on the conveyor even from far distance as of many meters since the colored or white LED that were mounted on the external surface of the baggage lite or fleshes.

The present invention can also detect pick up of the baggage from the conveyor by another person. This can be done by a 3D accelerometer sensor that can be mounted on the wireless electronic board, the wireless electronic board can include as Micro Controller—MCU that can drives the LEDs or other alerts as audio alerts.

The 3D accelerometer sensor can detect motion in 3D. While on the conveyor the direction is generally horizontal but if the baggage is picked up while the passenger or owner is not very near to the baggage, the 3D accelerometer sensor may detect an unusual movement as vertical and rotational motion. If the baggage is not generally moves in the horizontal speed as was in the conveyor and it is not very near to the baggage then the analyzed motion by the MCU or CPU/DSP by suitable software algorithm or electronic circuit will provide the detection and information refer to far pick up of the baggage and a suitable alert will be sent to the passenger or user HHD in order to inform him about the baggage picking up not very close to the user. The information or alert on the picking up of the baggage can be received or analyzed by the HHD since the HHD is wirelessly communicates with the wireless electronic card mounted in on or in the baggage.

The user with the HHD as Smartphone, Tablet etc, can then manually activates the LEDs wirelessly using the HHD and as suitable application runs on the HHD. The user may also activates any audio device that can derived by the wireless board MCU. The blinking or lite LEDs and the audio device alert on the baggage can be an efficient assistance to the user to search, detect and finding the baggage while it in far distance in case, it was gotten down from the conveyor for any reason as taken by another person.

The electronic board mounted on or in the baggage as suitcase or bag may include also other sensors as temperature, humidity, barometric pressure and others, their data can be read and registered as necessary as log file data with or without time date for tracking environmental conditions that the baggage was stay during as the flight or the travel.

The logged data when the baggage is as in flight can be also stored and or analyzed to be later transferred wirelessly to the HHD for later reading by the user including presentation as for the extreme environmental conditions that the baggage was stayed in.

The present invention solves the problem of waiting very close to the conveyor sometimes in very unconfutable conditions and the required attention and efforts to correctly detect the specific passenger's returned baggage. This is mostly need by weak as old age people and tired passengers.

The present invention can also solves the problem of unwanted get down of the baggage from the conveyor as picking up by undesired person and rapid detection of the baggage from a far distance visually or by audio alert activation that can be activated automatic or manually by the user. If the MCU detects the vertical motion as was on the conveyor after the baggage was returned and laid back the conveyor then the alerts can be stopped automatically or by the user.

The present invention can also solves the problem of tracking and logging the data of the conditions including environmental conditions that the baggage was stayed in during the travel. It can be as humidity, temperatures, shocks etc. This is useful as to prove the time and date of extreme conditions as when damage/s were found in the baggage after it was returned as on the conveyor and collected by the user.

In another mode of operation the present invention can be used for anti-theft and easy finding of baggage as bags and fast visual or audio identification from a distance of the baggage. In order to keep and prevent a lost or undesired left of the baggage, it can also enable detection and alert of any movement of the baggage as a bag in case of unwanted picking up as theft of the bag or the suitcase. When there is unwanted movement as in case of the baggage theft, the baggage movement can be detected by a movement sensor while the distance between the Smartphone and the user is increased or significantly increased or when there is any movement of the baggage while the baggage as a bag or suitcase are not near the baggage owner.

In this mode, the sensors as temperature, humidity, barometric pressure data can be transferred wirelessly from the wireless electronic board to the HHD as Smartphone in order to be analyzed in the HHD for much accurate local weather specifically in the environment where the user stays called micro local weather.

Since the wireless electronic board for its operation requires energy from as battery as a rechargeable battery and since it is common that in many cases users carry in their bags a large rechargeable battery as a "Power Bank" for charging their Smartphone or their other mobile apertures, generally via standard USB connectors, since that it is much efficient to integrate the wireless electronic card in the charging device as "Power Bank" for charging the mobile apparatus instead of caring two separated devices with common elements as the Anti lost wireless device and a "Power Bank".

As described in greater detail herein below, a device according to the teachings herein is a device that is physically associated with an item to be identified, for example, an item of baggage such as a suitcase, backpack or the like. The device is in wireless communication with a suitably-configured hand-held device (HHD) such as a smartphone or tablet that is used by a user who wants to be able to identify the item. When activated and out of communication range, the device and the HHD actively seek to establish a wireless link. When a wireless link is established, the device and/or the HHD take one or more actions desired by the user, for example:
  a. HHD informs the user of establishment of the link, e.g., by vibrating, producing an audible sound and/or displaying visible information on the display screen of the HHD;
  b. In some embodiments, the device producing identifying alarms that can be seen by the user in proximity of the item to be identified, e.g., e.g., by producing an audible sound and/or make a visible signal such as flashing lights;
  c. In some embodiments, the distance or change of distance between the device and the HHD is calculate and reported to the user via the HHD. In some such embodiments, useful for helping a user recover a suitcase from a conveyor belt, a decreasing or absolute range is reported visually, audibly and, or with vibrations by the HHD. In some such embodiments, useful for preventing theft or loss of an item, an increasing or absolute range is reported visually, audibly and, or with vibrations by the HHD.

Device Useful for Identifying Items
Device Body

A device according to the teachings herein typically comprises a body which includes one or more components which define the physical device. Non-limiting examples include a casing, support structures and the like.

In some embodiments, as discussed in greater detail below, the device body is shaped like a powerbank as for antitheft or anti-lost as carried in a bag.

In some embodiments, as discussed in greater detail below, the device body is shaped like a belt, preferably a reversibly-closeable belt, especially an adjustable-length belt. Some such embodiments can be used as luggage belts, for example, for encircling a suitcase and thereby being physically-associated therewith.

In some embodiments, the device body is substantially an item of baggage such as a suitcase, attached case or backpack.

In some embodiments, the device has two physically separated parts, mutually associated with electrical wires. In some such embodiments, there is an external portion configured to placed outside an item such as a suitcase or bag and a power portion configured to be placed inside the item and contain an electrical power supply, where the electrical wires connecting the external portion with the power portion provide electrical power from the electrical power supply to components of the external portion. In some embodiments, the external portion has parts configured to engage the slider or the tabs of a slider of a zipper. Such embodiments can be advantageously used by positioning the external portion in a partially-opened zipper of a suitcase or bag so that desired parts of the external portion protrude from the suitcase but the zipper is kept shut by engaging the zipper tabs or sliders with the external portion parts.

Electronic Board with Wireless Communication

A device according to the teachings herein includes an electronic board configured to wirelessly communicate with an HHD. In some embodiments, the electronic board is a component of a device and, for example, is contained within a device body. In some embodiments, the electronic board is the device.

The electronic board is an electronic board as known in the art and comprises components to implement any suitable technology or combination of technologies for wireless communication with a suitably-configured HHD. Non-limiting example of such components include Bluetooth® components allowing communication with an HHD via Bluetooth® protocols (Low Energy or Classic) and WiFi components allowing communication with an HHD via Wifi protocols. In preferred embodiments, the electronic board has a unique address, e.g., a MAC address.

In preferred embodiments, the wireless communication is short-range wireless communication, configured to allow peer-to-peer communication between the electronic board and the HHD.

In preferred embodiments, the wireless communication is short-range wireless communication, configured to allow peer-to-peer communication (between the electronic board and the HHD) at a range of at least 2 meters, at least 3 meters and even at least 5 meters.

In preferred embodiments, the wireless communication is short-range wireless communication, configured to allow peer-to-peer communication (between the electronic board and the HHD), or inquiry, searching or paging the electronic board at a range of not-greater than 200 meter, not greater than 100 meter and even not greater than 50 meter.

In some embodiments, the device is configured so that wireless communication is exclusively with a pre-designated HHD. In some embodiments, the device is configured so that wireless communication is exclusively with at least two pre-designated HHDs.

In some embodiments, the device is configured for wireless communication with a single HHD at any one time. In some embodiments, the device is configured for simultaneous wireless communication with at least two HHDs at any one time.

In some embodiments where the device has two physically separated parts as described above, the electronic board is part of the external portion of the device. Alternately, in some embodiments where the device has two physically separated parts as described above, the electronic board is part of the power portion of the device.

In preferred embodiments, when there is no communication link with an HHD, the electronic board is in a non-transmitting "listening" mode and only transmits on receipt of communication from an HHD. This saves electrical power and prevents the device from producing unnecessary transmission.

Electrical Power Supply

At least some components of a device according to the teaching herein, such as the electronic board, require electrical power to operate. Accordingly, in some embodiments, a device according to the teachings herein includes an electrical power supply.

In some embodiments, a device includes a battery holder that allows removable placement of batteries (regular or rechargeable) such as coin batteries, AA batteries or AAA batteries as an electrical power supply to provide electrical power to operate the device.

In some embodiments, a device includes ordinary non-removable batteries as components as an electrical power supply to provide electrical power to operate the device. Although such non-removable batteries are configured as a component of the device, such batteries can typically be replaced by a technician, for example if faulty.

In preferred embodiments, non-removable batteries are rechargeable and the device comprises a recharging port as known in the art, for example, a USB-C port and associated electronics for recharging the batteries.

In some embodiments, a device includes photoelectric cells that allow at least partial recharging of the electrical power supply of the device.

In some embodiments, the electrical power supply is configured to have a capacity sufficient to operate the device for a sufficient amount of time, and not much more. The advantage of such embodiments is that the device is relatively compact and/or cheap.

Powerbank Embodiment

In preferred embodiments, the device is configured to also operate as a powerbank and thus the electrical power supply is configured to have a capacity substantially greater than expected for operating the device itself, for example, at least 2000 mAh, at least 5000 mAh, at least 10000 mAh, at least 20000 mAh and even at least 30000 mAh.

Such embodiments further include the required electronics and other components required to recharge the electrical power supply (e.g., a USB-C port) and required to allow charging of another device as known in the art of power-banks (e.g., one or more USB outlet ports and/or a wireless charging pad).

Depending on the embodiments, the electronics required for providing the powerbank functionality to a device according to the teachings herein may be found entirely or partially on the electronic board, or may be found on a completely separate component.

In preferred embodiments, the powerbank electronics are functionally associated with the electronic board to wirelessly transmit the charge state of the powerbank electrical power supply to a HHD. This allows a user to accurately know how much charging capacity the powerbank has without having to access the device (e.g., removing from a bag) and looking at a display device such as a group of charge-indication LEDs.

In some embodiments, the device is configured to allow a user to control the powerbank wirelessly via the HHD for example to control the rate of charging of another device from the powerbank, select output voltage (3.3 V, 4.5 V, 5 V, 9 V, 12 V and so one), current limits, polarity and other voltage source parameters to allow charging devices that use other than USB-standard voltages. Such a powerbank can be considered an IoT (Internet of Things) device with all IoT capabilities like remote monitoring of the "Power Bank"

Warning or Indication Components

In some embodiments, the device further comprises at least one warning or indication component or element configured to produce an identifying indication or alarm. In some embodiments, some or all such warning or indication components are found on the electronic board. In some embodiments, some or all such warning or indication components are found on a different electronic board.

In some embodiments, at least one warning or indication component is a vibrating warning component and associated control electronics that vibrates as an identifying alarm when activated, e.g., a buzzer or other piezoelectric component such as known in the art of smart phones.

In some embodiments, at least one warning component is an audible warning or indication component and associated control electronics that makes a sound as an identifying alarm when activated, e.g., a speaker such as known in the art of smart phones.

In some embodiments, at least one warning component or indication is a visible warning or indication component and associated control electronics that emits light as an identifying alarm when activated, e.g., a light source such as an LED or group of LEDs.

Activation of the warning or indication components is preferably controllable, e.g., as concerns rate, intensity and patter of an identifying alarm, allowing different identifying alarms to be configured for different situations or due to personal preference.

In some embodiments, a warning or indication component is configured to be located externally when the device is physically associated with a device so that an identifying alarm can more effectively be perceived. In some embodiments where the device has two physically separated parts as described above, one or more of the warning or indication components, especially visible warning components, are part of the external portion of the device.

In some embodiments, one or more warning or indication components can be activated on demand via the HHD, depending on the embodiment in a fixed, pre-selected or user-selected manner.

In some embodiments, one or more warning or indication components is activated when a pre-set condition is met: an item associated with the device is moved (e.g., indicating theft), a distance between the device and the HHD is less than a predesignated threshold (e.g., indicating that the item is nearby, e.g., on a conveyor belt) or a distance between the device and the HHD is greater than a predesignated threshold (e.g., indicating theft or that the user forgot the item).

In some embodiments, the device is configured to activate a warning on the HHD concurrently with activation of a warning component.

In powebank embodiments where the device includes high-capacity electrical power storage, the warning or indication components can be selected for producing exceptionally intense identifying alarms as there is large available power. This aspect is useful especially for embodiments of the device used as anti-theft or anti-lost devices.

Distance Calculation

In some embodiments, the device is configured to estimate a distance between the device and an HHD with which the device is in wireless communication. Such estimation is performed in any suitable way, for example by wireless signal strength or BER (bit error rate) measurements of RSSI, Bluetooth® Link Key.

Orientation and/or Motion Detection Components

In some embodiments, a device includes orientation and/or motion detection components such as a 3D accelerometer, components typically found in smartphones. In some embodiments, some or all such detection components are found on the electronic board. In some embodiments, some or all such detection components are found on a different electronic board.

In some embodiments, a device further comprises a memory component which records readings from the detection components which readings can be accessed, for example, wirelessly using a HHD. In some such embodiments, a user accessing the memory component is able to see how an item associated with the device has been handled, e.g., jostled or dropped.

In some embodiments, when the device is in wireless communication with an HHD, readings or the results of calculations based on the readings of the detection components are transmitted to the HHD. Some such embodiments allow a user to receive various warnings and information that can be useful for example, as an anti-theft embodiments, a user receives a warning when the item associated with the device is moved in an unauthorized way, e.g., indicating that someone has picked up the item or removed the item from a conveyor belt.

Weather Component

In some embodiments, a device includes environmental sensors such as temperature sensor, barometric pressure sensor and humidity sensor, components typically found in smartphones. In some embodiments, some or all such detection components are found on the electronic board. In some embodiments, some or all such detection components are found on a different electronic board.

In some embodiments, a device further comprises a memory component which records readings from the detection components which readings can be accessed, for example, wirelessly using a HHD. In some such embodiments, a user accessing the memory component is able to see the environmental conditions in which the an item associated with the device has been maintained, e.g., left in the rain, stored in humid conditions, subject to freezing temperatures and the like.

In some embodiments, readings from such environmental sensors can be used to determine the micro local weather. In some embodiments, the readings from the environmental sensors are analyzed and used for forecasting rainfall, snowfall or significant expected weather changes, and a user can be alerted of the results of such forecasts via the HHD when the HHD and the device are in wireless communication. In order to increase the accuracy of the micro local weather forecast, in some embodiments the basic functionality of the HHD is used (as a smartphone to access data and weather forecast via the Internet in order to help calculate the micro local weather. In some embodiments, the data from the environmental sensors such as temperature, humidity and barometric pressure is transferred via the Internet to provide readings (together with location of the device) to help a meteorological service calculate and provide more accurate forecast and status of current weather in a specific area location.

Location-Determining Component

In some embodiments, a device includes a location-determining component (e.g., using one or more of GPS receiver, cellular telephone modem as for triangulation, WiFi network) such as typically found in smartphones. In some embodiments, some or all such components of the location-determining component are found on the electronic board. In some embodiments, some or all components of the location-determining component are found on a different electronic board.

When activated, the location-determining component determines the location of the device at a certain rate. In some embodiments, the device comprises a memory which records the determined location at a certain rate.

In some embodiments the device location data as GPS coordination data can be sent via the cellular network as to the HHD to be presented as graphically as on a vector map for user convenience to identify the device location.

Processor

In some embodiments, a device includes processor (e.g., a microcontroller) such as typically found in smartphones and computers and can optionally include peripherals components such as digital IO signal generators, timers, ADC, DAC and digital interfaces such as I2C, SPI and UART.

In some embodiments, such a processor and its said peripherals is integrated in the RF transceiver IC as one component.

In some embodiments, some or all of such a processor is found on the electronic board. In some embodiments, some or all of such a processor is found on a different electronic board.

In some such embodiments, a processor receives data from and/or sends commands to control one or more of the other components of the device. In some embodiments, some or all required calculations are performed on such a processor for transmission to an associated HHD. Depending on the embodiments, required calculations may include calculating the distance to an HHD and detecting when the device is moved.

User Interface

A device according to the teachings herein typically includes an On switch that when activated (e.g., pressed) the device is turned on. In some embodiments, the device also includes an Off switch to turn the device off. In some embodiments, the only way to turn the device off is wirelessly via a linked HHD. In some embodiments, the device includes a pairing switch: when it is desired to link the device to an HHD the pairing switch must be activated. Typically, a device includes a single physical switch that is functional to turn on the device and to function as a pairing switch.

In some embodiments, a device includes a user interface, in some embodiments a graphic user interface, to receive commands such as configuration commands, from a user. In some embodiments, some or all of such a user interface is found on the electronic board. In some embodiments, some or all of such a user interface is found on a different electronic board.

In preferred embodiments, a device is devoid of a user interface and instead, commands are received exclusively from a device such as an HHD or computer in wired or wireless communication with the device.

Other Functionality

In some embodiments where the device is an item of baggage or configured to function with an item of baggage, the device further comprises components for locking the item of baggage or locking the baggage wheels as but not limited upon receipt of commands sent wirelessly from the HHD and received by the electronic board.

Hand-Held Device (HHD)

As noted above, for use a device according to the teachings herein is physically associated with an item to be identified and, when in range, is in wireless communication with an HHD. The HHD is any suitable HHD especially, but not exclusively, a smartphone or a tablet computer.

The smartphone or tablet computer is appropriately-configured to operate with a device according to the teachings herein, e.g., with any suitable combination of software, hardware and firmware, typically including a program (application) that runs on the HHD.

In some embodiments, a processor of the HHD receives data from a device with which the HHD is in communication, performs required calculations, and sends commands to control one or more of the other components of the device.

In some embodiments, an HHD is configured to function as a user-interface, preferably a graphic-user interface, for displaying information from and about a device as well as to receive commands from a user and transmit the received commands to an HHD. In some embodiments, some or all commands from the HHD to a device can be transmitted when the device is in wireless communication with the HHD. In some embodiments, some commands from the HHD to a device can be transmitted only when the device is in wired communication with the HHD.

In some embodiments, an HHD is configured for wireless communication with a single device at any one time. In some embodiments, an HHD is configured for simultaneous wireless communication with at least two devices at any one time. For example, in some embodiments an HHD is configured to send communications to a first specific device only in specific time windows and to a second specific device in different specific time windows.

In some embodiments, pairing between an HHD and a device is performed wirelessly through the GUI of the HHD. In some embodiments, such pairing is performed through a wired connection (exclusively or optionally). In some embodiments, pairing requires activating a control on the device, e.g., pressing a button on the device.

Method for Identifying Items

A device according to the teachings herein is used in any suitable way, depending on the exact configuration and components of the device as described above.

Recovery of Item in Baggage Terminal

In such exemplary embodiments, the device is physically associated with an item of luggage and a user with a HHD uses the device to help collect the item of luggage from a conveyor belt in a baggage hall of an airport passenger terminal.

The device is in a non-transmitting "listening" mode when unloaded from the airplane and placed on the conveyor belt.

The user enters the baggage hall and activates the HHD which transmits a signal to the communication board.

Only when the device is in range, the device can reply or a wireless link is established between the HHD and the communication board. In some embodiments, the HHD informs the user (via a display on the screen, a vibration, audible sound) that the device and associated item are in range. In some embodiments, an indication of the distance between the HHD and the device is also provided. Additionally or alternately, automatically or on receipt of a command initiated by the user, one or more warning components are activated making it easy for the user to identify the baggage, e.g., lights flashing in some predetermined pattern.

In some embodiments, as the distance between the HHD and the device is reduced, the estimated distance is displayed quantitatively or qualitatively (e.g., color display that goes from red, to yellow to green as the estimated distance is reduced) and as the distance between the HHD and the device increases, the estimated distance is displayed quantitatively or qualitatively (e.g., color display that goes from green, to yellow to red as the estimated distance increases).

In some embodiments, a user can change various parameters using the HHD such as a value of estimated distance at which a specific signal is produced.

In some embodiments, readings from sensors are used alone or in combination with the estimated distance to calculate a direction and rate of motion, and the results of these calculations are optionally displayed on the HHD.

The user or a person sent by the user approaches the conveyor belt identifies and recovers the item.

If the item is moved (as detected by a sensor) by someone who is not the user, the user is informed, via the HHD (displayed on the screen, audible signal, vibration) and/or the device producing an identifying alarm.

In some embodiments, a user with multiple items of baggage (e.g., all items of baggage belonging to the same family or the same group of tourists) configures the respective devices to provide the same or similar identifying alarms, allowing easier identification of all the items.

Theft or Loss Prevention

In some embodiments, the device is physically associated with an item to help prevent theft or loss of the item.

The device is close to the user with a wireless link between the electronic board and the HHD.

If the item is moved (as detected by a sensor), taken away from user/forgotten by a user who leaves (as indicated by loss of the communication link or a distance that is above a threshold), the user is informed, via the HHD (displayed on the screen, audible signal, vibration) and/or the device producing an identifying alarm.

In some embodiments, the user is informed via the HHD and the device is activated to produce an identifying alarm by a user-command via the HHD.

In some such embodiments where the HHD includes a location determining component as a GPS receiver or where the device includes a location-determining component, a user defines safe areas. When the HHD or the location-determining component determines that the device is located in a safe area, no alarm is activated. If the location-determining component determines that the device is removed from a defined safe area, an alarm is activated, on the HHD and/or by the device.

FIG. 1 is a schematic depiction of a radio-frequency transceiver arrangement 10 placeable in or attachable on said object interest. The aforesaid arrangement constitutes an identification device or a component of an identification device according to the teachings herein. Arrangement 10 is configured for wireless communication and includes antenna 12, transceiver 11, a processor 14 (MCU—microcontroller), environmental sensors and orientation and/or motion detection components 13, warning components 15 and a battery 18.

According to one embodiment of the present invention, arrangement 10 including electric battery 18, wireless transceiver 11 connectable to said short-distance wireless communication hand-held device, sensor 13 (for example, an acceleration sensor), a visual or audio indicator element 15 and a microcontroller (processor) 14 configured for activating indicator element 15 in response to paging to or disconnecting from transceiver 11 with short-distance wireless communication handheld device (not shown) is attachable to or insertable into a object of interest such as a suitcase or a bag is usable for assisting a user in collecting the aforesaid object of interest in a baggage way in the airport passenger's terminal after landing. Assisting in collecting baggage stored in the cargo cabinet of the aircraft during the flight is also in the scope of the present invention.

The acceleration sensor 13 is configured for recognition of undesirable movement of the object interest in user's absence.

According to another embodiment of the present invention, a Power Bank battery comprises a wireless transceiver connectable to a short-distance wireless communication with hand-held device. This power bank battery embodiment is designed for use as in a safe-area mode described above. A GPS sensor provided with at least one cellular modem and at least one SIM card is the scope of the present invention.

According to another embodiment of the present invention, a Power Bank battery comprises a wireless RF transceiver connectable to a short-distance wireless communication with hand-held device. This power bank battery embodiment is designed for use if the wireless RF transceiver does not able to communicate with the HHD described above while the power bank is out of range of the said short wireless communication. According to that embodiment the power bank comprises also A GPS sensor provided with at least one cellular modem with or without at least one SIM card is the scope of the present invention. The GPS sensor and the cellular modem enable the user to locate or to track the lost bag even if the bag with the short distance wireless communication as Bluetooth or WiFi are out of range.

The cellular modem support at least one of the exist standards as GSM, GPRS, $4^{th}$—4G, $5^{th}$—5G or any further generations.

Figure 2:
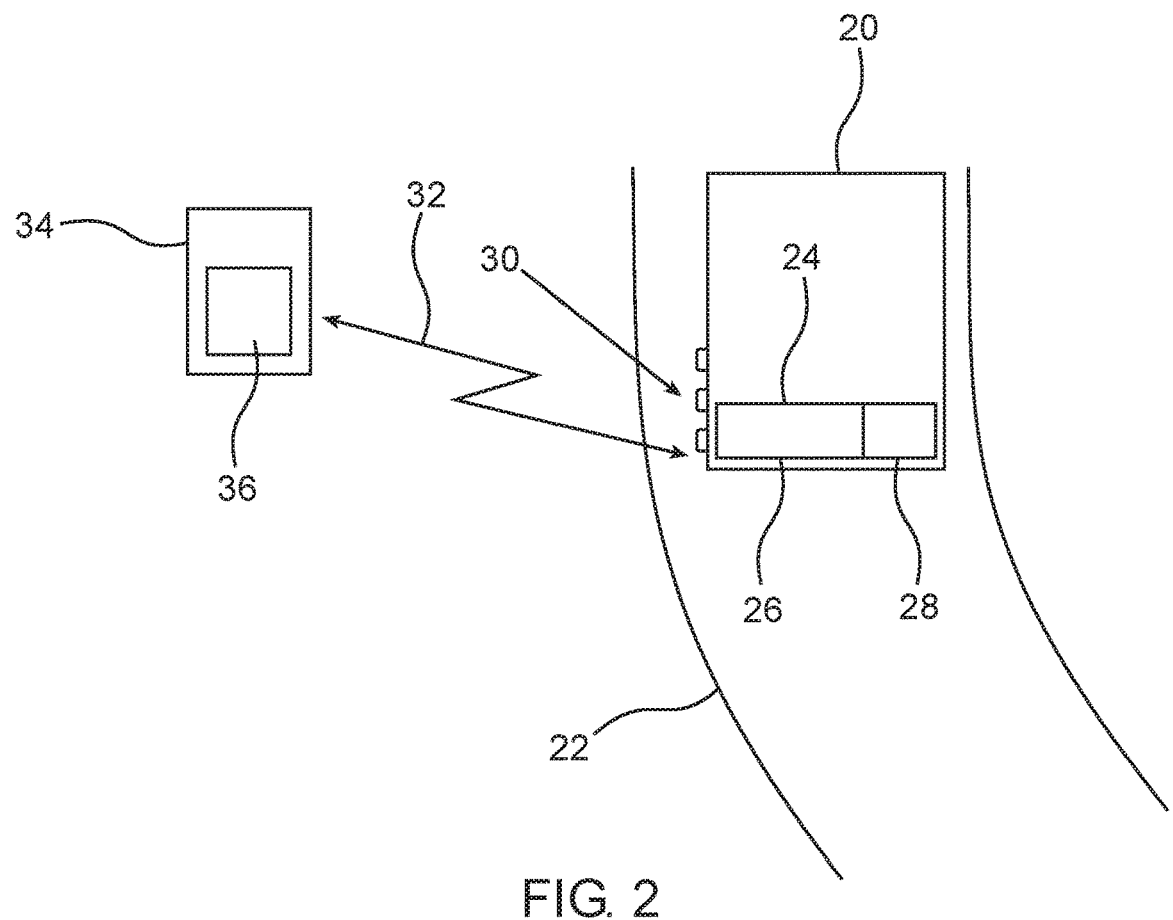
FIG. 2 is a schematic diagram of a system for locating and anti-theft protecting an object of interest.

FIG. 2 is a schematic depiction of a suitcase 20 on a conveyor belt 22 physically associated with an embodiment of a device 24 according to the teachings herein, device 24 including an electronic board 26, an electrical power supply 28 and light-emitting diodes 30 as warning components located on the outside of suitcase 20. Electronic board 26 is in wireless communication 32 with a single HHD 34 displaying a GUI for operating device 24 on a display screen 36.

Figure 3:
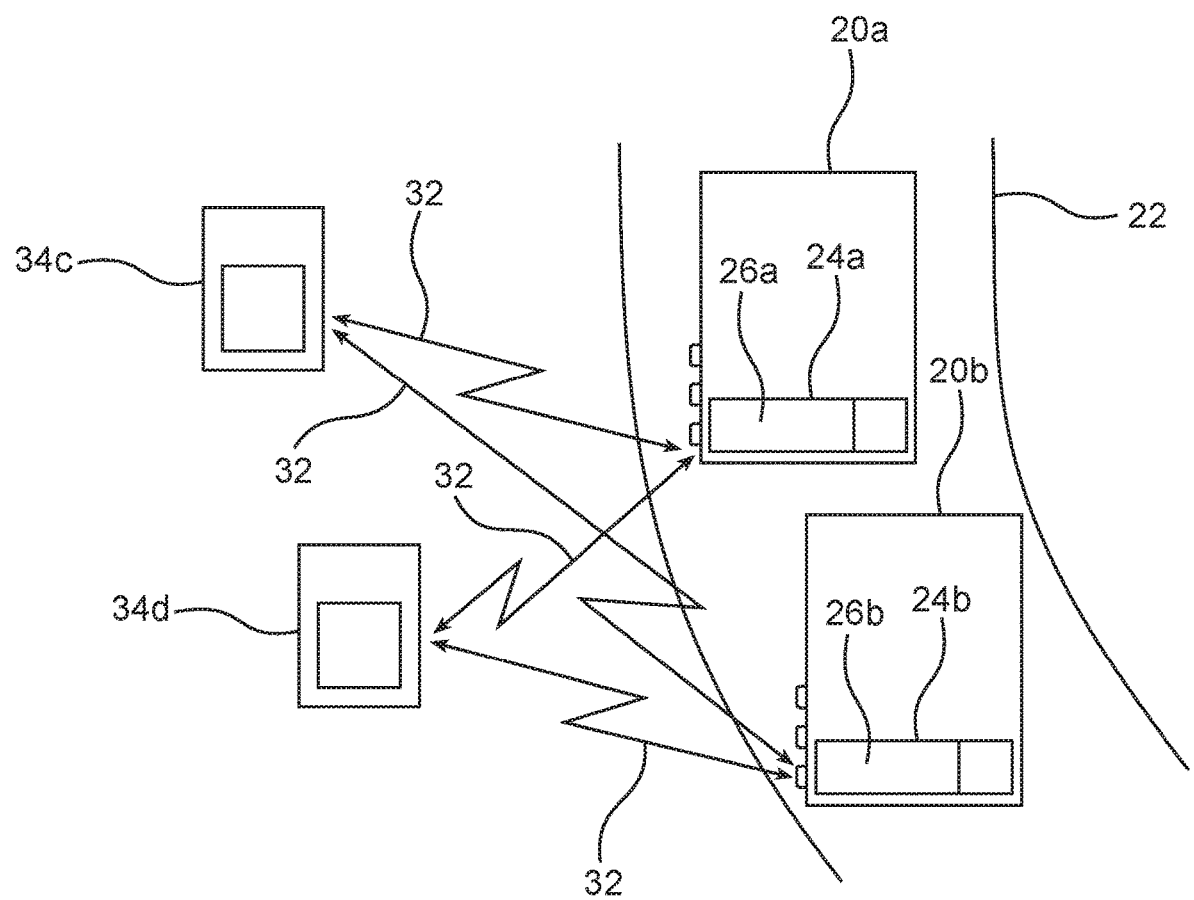
FIG. 3 illustrates two objects of interest and two handheld devices concurrently paired to each other.

FIG. 3 is a schematic depiction of two different suitcases 20a and 20b on a conveyor belt 22, each suitcase 20a and 20b physically associated with a different device 24a and 24b according to the teachings herein respectively, devices 24a and 24b each including an electronic board 26a and 26b. Each one of electronic boards 26a and 26b is in wireless communication 32 with two HHDs, 34c and 34d.

Figure 4:
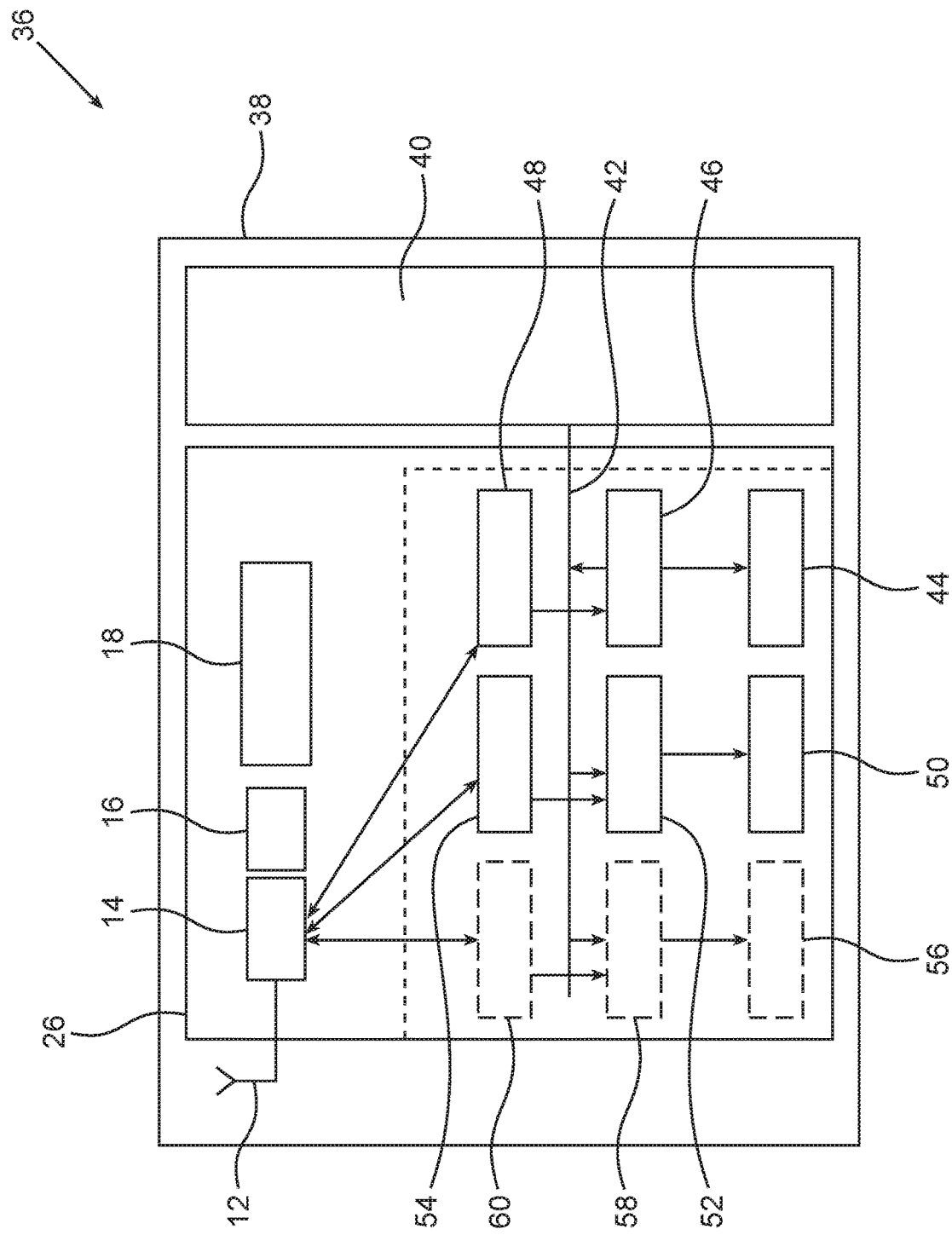
FIG. 4 is a schematic diagram of radio-frequency transceiver arrangement embedded into a Power Bank.

FIG. 4 is a schematic depiction of an embodiment of an identification device 36 according to the teachings herein having a casing 38 shaped like a standard powerbank and also configured to function as a powerbank. Device 36 includes an electronic board 26 configured for wireless communication and includes an antenna 12, a processor 14 (MCU—microcontroller), environmental sensors and orientation and/or motion detection components 16 and warning components 18. Device 36 further includes an electrical power supply 40 (rechargeable Li-polymer batteries) providing a total capacity of 30000 mAh.

Battery poles 42 are functionally associated with a USB voltage input connector 44 for charging power supply 40 from an external source.

Wireless charging pad 46 for wirelessly charging other devices via induction is functionally associated with battery poles 42. USB voltage output connector 50 for charging devices (such as smartphones) via a standard USB connector is functionally associated with battery poles 42 through a DC/DC converter 52.

Auxiliary voltage output connector 56 for charging devices (such as laptop computers) via an auxiliary connector is functionally associated with battery poles 42 through an auxiliary DC/DC converter 58. DC/DC converter 58 is controlled with a digital potentiometer or DAC 60 which is controlled by a user via commands sent through an HHD and received by electronic board 26.

An important advantage of the teachings herein is that these allow easy differentiation of two similar items, e.g., two otherwise identical bags, preventing mistaken collection of another person's bag.

Another important advantage of the teachings herein is that these allow a person who is not familiar with the items to identify these. For example, a user is asked to pick up luggage belonging to another person so that the user uses an HHD to absolutely identify the baggage. For example, a user who is a porter is asked to transport multiple items of baggage owned by two different persons to two different locations. Each item is associated with a separate device, each device in communication with a HHD of the porter, where all devices associated with items of the same person are configured to make the same identifying alarm when activated.

Although the teachings herein have been discussed primarily with reference to identifying items such as baggage, the teachings herein can also be used to identify other items such as people and animals. For example, a device according to the teachings herein can be associated with a person such as a child in a crowded event (worn, or placed in a bag the person is carrying) and allow a user (e.g., parent or care take) to easily find the person in the crowd.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof.

As used herein, the indefinite articles "a" and "an" mean "at least one" or "one or more" unless the context clearly dictates otherwise.

As used herein, when a numerical value is preceded by the term "about", the term "about" is intended to indicate +/−10%.

As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

Embodiments of methods and/or devices described herein may involve performing or completing selected tasks manually, automatically, or a combination thereof. Some methods and/or devices described herein are implemented with the use of components that comprise hardware, software, firmware or combinations thereof. In some embodiments, some components are general-purpose components such as general-purpose computers or digital processors. In some embodiments, some components are dedicated or custom components such as circuits, integrated circuits or software.

For example, in some embodiments, some of an embodiment is implemented as a plurality of software instructions executed by a data processor, for example which is part of a general-purpose or custom computer. In some embodiments, the data processor or computer comprises volatile memory for storing instructions and/or data and/or a nonvolatile storage, for example, Flash IC, a magnetic hard-disk and/or removable media, for storing instructions and/or data. In some embodiments, implementation includes a network connection. In some embodiments, implementation includes a user interface, generally comprising one or more of input devices (e.g., allowing input of commands and/or parameters) and output devices (e.g., allowing reporting parameters of operation and results.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A system for locating an anti-theft protecting and object of interest, comprising:
    at least one short-distance wireless communication handheld device (HHD) associated with a user, said the HHD device includes a warning indicator;
    at least one radio-frequency transceiver arrangement being placeable in or attachable on said object interest, consisting of:
    a power-bank device with a rechargeable battery for wirelessly charging mobile devices via a wireless charging pad or via a cable;
    an electronic board with electrical circuits for charging said rechargable battery;
    an integrated wireless transceiver and a microcontroller with firmware in the said power-bank device, for transmission of a measured values monitoring from a battery capacity level sensor and movement values sensing by motion sensor or by tridimensional acceleration from an accelerometer applied to said object of interest to said HHD device; a visual or audio indicator element, wherein the said microcontroller configured to receive an inquiry or paging command from said HHD device via said wireless transceiver for activating the said visual or audio indicator element remotely when said user searching the said object of interest or when said radio-frequency transceiver being disconnected from the HHD device; and
    said microcontroller is further configured to activate said visual or audio indicator element in response to movement detection by said motion sensor or by said accelerometer and said microcontroller is configured for sending an alarm signal to said handheld device for activating said warning indicator in response to said short-distance wireless communication handheld device.

2. The system according to claim 1, wherein said wireless transceiver is configured for receiving an inquiry from said short-distance wireless communication hand-held device and transmit sensed data to said short-distance wireless communication hand-held device.

3. The power bank according to claim 1, comprising an auxiliary connector with selectable output voltages selected through the hand held device; said power bank compressing at least one variable output voltage DCDC convertor and at least one DAC or digital potentiometer for adjusting the DCDC output voltage sent via said auxiliary connector.

4. The system according to claim 1, wherein said object of interest is selected from the group consisting of a suitcase, a bag, a purse, a box, a carton and any combination thereof.

5. The system according to claim 1, wherein said transceiver is pair-able with said short-distance communication handheld device.

6. The system according to claim 1, wherein said short-distance wireless communication uses Bluetooth or Wi-Fi protocol.

7. The system according to claim 1, wherein said warning indicator comprises at least one component selected from the group consisting of a light source, a sound source, a vibrator and any combination thereof.

8. The system according to claim 1, wherein said radio-frequency transceiver arrangement comprises at least one sensor selected from the group consisting of an acceleration sensor, a motion sensor temperature sensor, a humidity sensor, and a barometric-pressure sensor.

9. The system according to claim 8, wherein said microcontroller is configured for transmitting data sensed by said acceleration sensor, temperature sensor, humidity sensor and barometric-pressure sensor to said handheld device.

10. The system according to claim 1, wherein said at least one radio-frequency transceiver arrangement is pageable with more than one said handheld device.

11. The system according to claim 1, wherein said arrangement is wirelessly connectable to an internet network as an IoT network and data protocol.

12. The system according to claim 1, wherein said microcontroller is configured for activating said warning indicator in response to disconnecting said transceiver and said short-distance wireless communication handheld device.

13. The system according to claim 1, wherein said microcontroller is configured for activating said warning indicator in response to movement detection by said accelerometer.

14. The system according to claim 1, wherein said microcontroller is configured for sending an alarm signal to said handheld device and/or activating said warning indicator in response to a request from said short-distance wireless communication handheld device request.

15. The system according to claim 1, wherein said microcontroller is configured for reading and sending a battery status to said short-distance wireless communication handheld device.

16. The system according to claim 1, wherein the said wireless transceiver is mounted inside a clip connected to said power bank.

17. The system according to claim 1, wherein said visual and audio indications element is mounted inside a clip connected to said power bank.

18. The system according to claim 1, wherein at least one of said sensors is mounted inside a clip connected to said power bank.

19. The system according to claim 1, wherein at least one connector is mounted in a clip connected to said power bank.

20. The system according to claim 19, wherein the connector is an USB connector.

21. The system according to claim 1, further comprising a GPS sensor provided with at least one cellular modem.

22. The system according to claim 1, further comprising a GPS sensor provided with at least one cellular modem and at least one SIM card.

* * * * *